No. 637,460. Patented Nov. 21, 1899.
W. HARLAN.
CONDENSED MILK CAN HOLDER.
(Application filed Mar. 27, 1899.)
(No Model.)
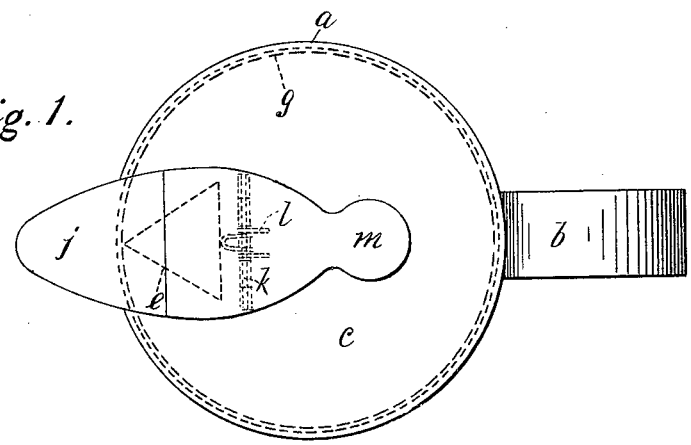
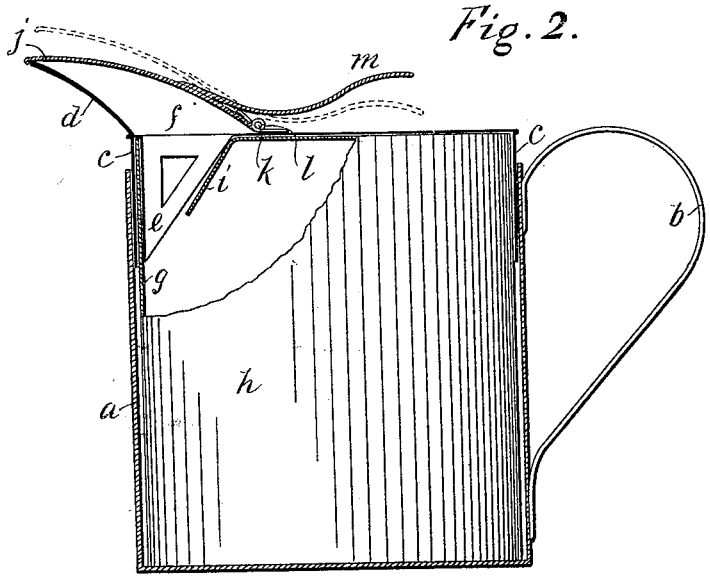
WITNESSES:
Sydney P. Prescott
C. P. Colton
INVENTOR
Wilbur Harlan
BY Rufus King.
ATTORNEYS.

UNITED STATES PATENT OFFICE.

WILBUR HARLAN, OF NEW YORK, N. Y., ASSIGNOR OF ONE-HALF TO DARCEY J. DINSMORE, OF SAME PLACE.

CONDENSED-MILK-CAN HOLDER.

SPECIFICATION forming part of Letters Patent No. 637,460, dated November 21, 1899.

Application filed March 27, 1899. Serial No. 710,645. (No model.)

*To all whom it may concern:*

Be it known that I, WILBUR HARLAN, a citizen of the United States, and a resident of New York city, county of New York, and State of New York, have invented certain new and useful Improvements in Condensed-Milk-Can Holders, of which the following is a specification, reference being had to the accompanying drawings, forming a part thereof, in which similar letters of reference indicate corresponding parts.

This invention relates to an improvement in condensed-milk-can holders, its object being to provide a device of this character in which the can may be inserted, its cover punctured, and all the milk contained therein exhausted without removing the can from the holder. Holders having covers carrying the cutter have been used for this purpose, but are objectionable for the reason that a space is left between the cutter and the wall of the can, through which the milk leaks out without passing through the spout, and when the milk is not all used within a reasonable time it crystallizes between the cutter and the wall of the can, so that the egress of the milk remaining is impeded.

The invention consists in a telescopic holder-cover adapted to closely fit over the can and slide into the base portion of the holder and carrying a cutter adapted to cut the can-cover close to the wall of the can.

The invention will be hereinafter fully described, and specifically set forth in the annexed claims.

In the accompanying drawings, Figure 1 is a plan view; and Fig. 2 is a side elevation, the holder being sectional and the can partly broken away.

In constructing my device I employ a cylindrical base portion $a$ of any suitable material and ornamented in any desired manner and carrying the handle $b$. Adapted to fit closely within the open end of this base portion of the holder is the cylindrical cover $c$, which has a spout $d$ fixed to one side thereof. A sharp V-shaped cutter $e$ is formed integrally with said cover or fixed thereto directly under the opening $f$ into the spout $d$. The apex of the cutter $e$ lies close to the lower end of the wall of the cover $c$ on one side, only sufficient space being left between said cutter and the wall of said cover to receive the wall $g$ of the can $h$ when the top $i$ of the can is punctured.

The lid $j$, adapted to fit closely over the spout, is hinged at the rear end of the spout to the top of the cover $c$, and a coiled spring $l$, fixed on the pintle $k$ of the hinge, keeps said lid normally in closed position, as shown by full lines in Fig. 2. A handle $m$, formed integrally with said lid or fixed thereto, is projected rearwardly beyond the hinge.

In the operation of the device the milk-can is inserted in the lower portion of the holder and the cover placed in position upon the top of the can and then pressed downwardly. The cutter $e$ will puncture the top of the milk-can, cutting a V-shaped piece out of the cover and bending it downwardly to the position shown in Fig. 2. The movement of the cover being vertical, the cutter $e$ will always lie close to the wall $g$ of the can $h$, and no milk can get between said cutter and said wall, and therefore cannot leak out without passing through the spout. When it is desired to draw milk from the can, the holder is held in an inclined position and the handle $m$ pressed downwardly, opening the lid $j$, and the milk will flow freely through the aperture made by the cutter and through the spout $d$. When returned to its normal position, the lid will close, cutting off the flow of milk.

It is obvious that the cover and the lower portion of the holder may be ornamented in any desired manner.

Having thus described my invention, what I claim as new, and desire to secure by Letters Patent, is—

1. In a milk-can holder, the combination of a base portion, a cover adapted to slide vertically within said base portion, a cutter fixed to said cover, the apex of said cutter being separated from the wall of the cover a distance equal to the thickness of the can, substantially as described.

2. In a milk-can holder, the combination of a base portion, a cover adapted to telescope within said base portion, a cutter carried by said cover and spaced from the wall of the cover a distance equal to the thickness of the can, a spout carried by said cover over the cutter, and a spring-actuated lid therefor, substantially as described.

In testimony that I claim the foregoing as my invention I have signed my name, in presence of two witnesses, this 25th day of March, 1899.

WILBUR HARLAN.

Witnesses:
SYDNEY D. PRESCOTT,
C. P. COLTON.